United States Patent
Harada et al.

[11] Patent Number: 5,821,554
[45] Date of Patent: Oct. 13, 1998

[54] PROCESS FOR PREPARING POLYURETHANE FOAM

[75] Inventors: Shoichiro Harada; Mitsuru Sakai; Kazunari Takemura; Akito Itoi; Makoto Okubo, all of Wakayama, Japan

[73] Assignee: Kao Corporation, Tokyo, Japan

[21] Appl. No.: 815,589

[22] Filed: Mar. 12, 1997

[30] Foreign Application Priority Data

Mar. 12, 1996 [JP] Japan ................................ 8-084847
Mar. 12, 1996 [JP] Japan ................................ 8-084848

[51] Int. Cl.$^6$ .................................................. C08G 18/14
[52] U.S. Cl. ........................ 252/182.24; 252/182.28; 521/155; 521/159; 521/172; 521/173; 528/272; 528/308.1; 560/89
[58] Field of Search .......................... 521/172, 155, 521/173, 159; 528/272, 308.1; 560/89; 252/182.24, 182.28

[56] References Cited

U.S. PATENT DOCUMENTS

| | | |
|---|---|---|
| 4,439,550 | 3/1984 | Brennan . |
| 4,444,918 | 4/1984 | Brennan . |
| 4,861,826 | 8/1989 | Hummerich et al. .................... 524/840 |
| 5,116,683 | 5/1992 | Koyama et al. ......................... 428/403 |
| 5,188,716 | 2/1993 | Schwerzel et al. ...................... 524/901 |
| 5,319,056 | 6/1994 | Wamprecht et al. ..................... 528/49 |
| 5,596,021 | 1/1997 | Adembri et al. ......................... 521/79 |

FOREIGN PATENT DOCUMENTS

| | | |
|---|---|---|
| 2925395 A | 6/1996 | Australia . |
| 0248570 A1 | 12/1987 | European Pat. Off. . |
| 1073303A | 9/1954 | France . |
| 4440858 A1 | 5/1996 | Germany . |
| 6181417A | 4/1986 | Japan . |
| 782471A | 3/1995 | Japan . |
| 684400 | 12/1952 | United Kingdom . |

*Primary Examiner*—John M. Cooney, Jr.
*Attorney, Agent, or Firm*—Birch, Stewart, Kolasch & Birch, LLP

[57] ABSTRACT

A polyester-polyol prepared by polycondensation of an acid component comprising terephthalic acid and adipic acid, and a polyhydric alcohol component, wherein the molar ratio of the terephthalic acid/adipic acid is 0.05 to 0.3; a process for preparing a polyurethane foam comprising reacting a polyisocyanate component and a polyol component, wherein the polyol component contains the above polyester-polyol; and a process for preparing a polyurethane foam comprising reacting an isocyanate prepolymer made of a polyisocyanate component and a polyol component (I) with a polyol component (II), wherein the polyol component (I) comprises the above polyester-polyol.

9 Claims, No Drawings

PROCESS FOR PREPARING POLYURETHANE FOAM

BACKGROUND OF THE INVENTION

1. Field of the Invention

The present invention relates to a process for preparing a polyurethane foam. Specifically, the present invention relates to a process for preparing a polyurethane foam which has a high mechanical strength and can be suitably used as shoe soles, and to a polyester-polyol used as a starting material of the polyurethane foam.

2. Discussion of the Related Art

A polyurethane foam is highly resistant to impact, chemicals, abrasion and cold. A polyurethane foam with wide variety of properties, from flexible to rigid, can be prepared by appropriately combining main starting materials of a polyurethane foam, i.e. polyol and polyisocyanate.

For preparing a rigid polyurethane foam, a polyfunctional polyol having a relatively low molecular weight is used. On the other hand, for preparing flexible polyurethane foam, a polyol having a relatively high molecular weight and a low functionality is used.

The above polyurethane foam is prepared from a blowing agent such as water or fluorocarbon compounds, and a polyol. By controlling the amount of the blowing agent, the density of the polyurethane foam can be adjusted to a desired level.

Generally, the lower the density of polyurethane foam is, the lower the cost of raw materials becomes. However, the mechanical strength of the urethane foam is lowered in accordance with the lowering of its density because the amount of resin per volume is reduced.

In order to improve the mechanical strength of the urethane foam, it has been proposed that additives such as a cross-linking agent, a polyfunctional polyol and an aromatic polyol are used together with the starting polyol.

The above proposal, however, has some problems. That is, the use of the cross-linking agent and the polyfunctional polyol tends to cause gelation. Also, when a prepolymer which is made from the aromatic polyol is used as a starting material for a polyurethane foam, it is difficult to adjust the viscosity and melting point of the prepolymer to a suitable level for the preparation of a polyurethane foam because the aromatic polyol has a remarkably high viscosity and a melting point.

In consideration of the above problems of the prior art, the present invention has been made in order to provide a process for preparing a polyurethane foam which has a low density, acceptable appearance and feeling, and excellent mechanical strength such as tensile or tear strength.

The above and other objects of the present invention will be apparent from the following description.

SUMMARY OF THE INVENTION

The gist of the present invention concerns:

(1) a polyester-polyol prepared by polycondensation of an acid component comprising (a) terephthalic acid and (b) adipic acid with a polyhydric alcohol component, wherein the molar ratio of the (a) terephthalic acid/(b) adipic acid is 0.05 to 0.3;

(2) a process for preparing a polyurethane foam comprising reacting a polyisocyanate component and a polyol component, wherein the polyol component comprises a polyester-polyol prepared by polycondensation of an acid component comprising (a) terephthalic acid and (b) adipic acid with a polyhydric alcohol component, wherein the molar ratio of the (a) terephthalic acid/(b) adipic acid is 0.05 to 0.3; and (3) a process for preparing a polyurethane foam comprising reacting an isocyanate prepolymer prepared from a polyisocyanate component and a polyol component (I), with a polyol component (II), wherein the polyol component (I) comprises a polyester-polyol prepared by polycondensation of an acid component comprising (a) terephthalic acid and (b) adipic acid with a polyhydric alcohol component, wherein the molar ratio of the (a) terephthalic acid/(b) adkipic acid is 0.05 to 0.3.

DETAILED DESCRIPTION OF THE INVENTION

The polyester-polyol of the present invention is useful as a starting material for preparing a polyurethane foam.

The polyester-polyol of the present invention is prepared by polycondensation of an acid component comprising (a) terephthalic acid and (b) adipic acid in a molar ratio of 0.05 to 0.3, and a polyhydric alcohol component. The above "comprising" means that the acid component is composed of (a) terephthalic acid and (b) adipic acid, or may contain ingredients other than (a) terephthalic acid and (b) adipic acid as long as the ingredients do not hinder the achievement of the object of the present invention. In the present invention, it is usually desired that the acid component consists essentially of (a) terephthalic acid and (b) adipic acid.

The molar ratio of (a) terephthalic acid/(b) adipic acid is adjusted to not less than 0.05, preferably not less than 0.08 in order to avoid that the solidification point of the acid component does not become high, and that the acid component shows fluidity under molding conditions employed (molding temperature: about 40° C.). Also, the molar ratio is adjusted to not more than 0.3, preferably not more than 0.25, more preferably not more than 0.15, in order to avoid the difficulties in injection during molding due to the increase of the viscosity of the acid component. Also, when the polyester-polyol obtained is included in the polyol component, it is desired that the molar ratio of (a) terephthalic acid/(b) adipic acid is not more than 0.25, preferably not more than 0.15, more preferably not more than 0.12.

Preferred examples of the above polyhydric alcohol include at least one of ethylene glycol and 1,4-butanediol.

The polyester-polyols of the present invention can be obtained by polycondensation of the above acid component and an excess amount of the above polyhydric alcohol.

It is desired that the number average molecular weight of the polyester-polyol of the present invention is 500 to 3000, preferably 1000 to 2500 from the viewpoint of viscosity and melting point.

One of major characteristics of the process for preparing a polyurethane foam of the present invention resides in that the polyester-polyol as mentioned above is used in its process. The use of the polyester-polyol imparts excellent mechanical strength to a resulting polyurethane foam.

There are two major embodiments in the process for preparing a polyurethane foam of the present invention using the polyester-polyol.

(1) A process for preparing a polyurethane foam comprising reacting a polyisocyanate component and a polyol component, wherein the polyol component comprises a polyester-polyol prepared by polycondensation of an acid component comprising (a) terephthalic acid and (b) adipic acid, and a polyhydric alcohol, and the molar ratio of the (a) terephthalic acid/(b) adipic acid is 0.05 to 0.3 (hereinafter referred to as Process I); and (2) A process for preparing a polyurethane foam comprising reacting an isocyanate prepolymer made of a polyisocyanate component and a polyol component (I), with a polyol component (II), wherein the polyol component (I) comprises a polyester-polyol prepared by polycondensation of an acid component comprising (a) terephthalic acid and (b) adipic acid, and a polyhydric alcohol, and the molar ratio of the (a) terephthalic acid/(b) adipic acid is 0.05 to 0.3 (hereinafter referred to as Process II).

First, Process I is described below.

In Process I, as the polyol component which is reacted with the polyisocyanate component, those comprising the polyester-polyol as detailed above are used.

In the polyol component, a polyol other than the above polyester-polyol can be used. The polyol other the above polyester-polyol include, for instance, a polyester-polyol obtained by polycondensing at least one of polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrol and sorbitol, and at least one of dibasic acids such as oxalic acid, malonic acid, succinic acid, adipic acid, sebacic acid and a dimer acid; a polypropylene glycol; polyether-polyol such as polyoxytetramethylene glycol; polycaprolactone polyol; and polycarbonate polyol. The above polyols can be used alone or in an admixture thereof.

In order to maintain a preferable state of liquid and viscosity and prepare a polyurethane foam having an excellent mechanical strength, it is desired that the content of the polyester-polyol in the above polyol component is 10 to 80% by weight, preferably 20 to 70% by weight, more preferably 40 to 60% by weight.

In the present invention, the above polyol component may optionally contain auxiliaries such as chain extenders, blowing agents, urethane promoting catalysts, cell regulators such as surfactants, stabilizers and pigments in a proper amount.

As the above chain extenders, low molecular compounds having 2 or more active hydrogens can be used. Typical examples of the chain extenders include, for instance, polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose and sorbitol; aliphatic polyhydric amines such as ethylenediamine and hexamethylenediamine; aromatic polyhydric amines; alkanolamines such as diethanolamine, triethanolamine and diisopropanolamine.

Examples of the above blowing agents are, for instance, water, and fluorocarbons such as trichlorofluoromethane, dichlorodifluoromethane and trichlorodifluoroethane. Those blowing agents can be used alone or in an admixture thereof.

Examples of the above urethane promoting catalysts are, for instance, tertiary amines such as triethylamine, triethylenediamine, N-methylmorpholine, N-ethylmorpholine, N,N,N',N'-tetramethylhexamethylenediamine, 1,2-dimethylimidazol; and tin compounds such as tin (II) acetate, tin (II) octanoate, tin (II) laurate, dibutyltin dilaurate, dibutyltin dimaleate, dioctyltin diacetate and dibutyltin dichloride. Those urethane promoting catalysts can be used alone or in an admiture thereof.

Examples of the above cell regulators are, for instance, silicone surfactants such as dimethylpolysiloxane, polyoxyalkylene polyol-modified dimethylpolysiloxane and alkylene glycol-modified dimethylpolysiloxane; and anionic surfactants such as fatty acid salts, sulfuric acid ester salts, phosphoric acid ester salts and sulfonates.

Examples of the above stabilizers are, for instance, hindered phenol radical scavengers such as dibutylhydroxytoluene, pentaerythrityl-tetrakis[3-(3,5-di-t-butyl-4-hydroxyphenyl)propionate] and isooctyl-3-(3,5-di-t-butyl-4-hydroxyphenyl)propionate; antioxidants such as phosphorous acid compounds such as triphenylphosphite, triethylphosphite and triphenylphosphine; ultraviolet absorbing agents such as 2-(5-methyl-2-hydroxyphenyl) benzotriazole and a condensation product of methyl-3-[3-t-butyl-5-(2H-benzotriazole-2-yl)-4 -hydroxyphenyl] propionate and polyethylene glycol.

Examples of the above pigment are, for instance, inorganic pigments represented by transition metal salts; organic pigments represented by azo compounds; and carbon powder. The present invention is not limited to those exemplified ones.

The polyol component thus obtained is in the state of liquid at room temperature and injectable even at a low pressure. Thus, a polyurethane foam can be readily obtained by reacting the polyol component with a polyisocyanate component as mentioned below.

In Process I, representative examples of the polyisocyanate component are, for instance, isocyanate prepolymers.

The isocyanate prepolymer is obtained by a conventional method comprising mixing, stirring and thereby allowing to react a polyol and an excess polyisocyanate monomer optionally in the presence of auxiliaries such as a stabilizer.

Concrete examples of the above polyisocyanate monomers are, for instance, polyisocyanate compounds such as tolylene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as carbodiimide-modified compounds thereof. Those polyisocyanate monomers can be used alone or in an admixture thereof. Among them, single use of 4,4'-diphenylmethane diisocyanate or the combined use of 4,4'-diphenylmethane diisocyanate and a carbodiimide-modified 4,4'-disphenylmethane diisocyanate is particularly preferred in the present invention.

Examples of the above polyol include, for instance, polyester-polyols obtained by polycondensation of at least one of polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose and sorbitol, and at least one of dibasic acids such as oxalic acid, malonic acid, succinic acid, adipic acid, sebacic acid and a dimer acid; polypropylene glycol; polyether-polyols such as polyoxytetramethylene glycol; polycaprolactone polyol; and polycarbonate polyol. Those polyols can be used alone or in an admixture thereof.

If necessary, various auxiliaries may be used in the preparation of the isocyanate prepolymer.

As the above auxiliaries, there can be used, for instance, the auxiliaries used in the preparation of the above polyester-polyol; and compounds to prevent self-polymerization of the isocyanate prepolymer, acid gases such as hydrogen chloride gas and sulfur dioxide gas, acid chlorides such as acetyl chloride, benzoyl chloride and isophthalic acid chloride, phosphoric acid compounds such as phosphoric acid, monoethyl phosphate and diethyl phosphate. Those auxiliaries can be used alone or in an admixture thereof.

It is desired that the content of NCO in the isocyanate prepolymer is not less than 15%, preferably not less than 17% in order to avoid undesirably high viscosity which results in difficulties in molding with a low pressure blowing machine; and not more than 25%, preferably not more than 22% in order to avoid undesirably low viscosity which results in poor measuring accuracy of a foaming machine.

The above isocyanate prepolymer is in a state of liquid at a temperature of not lower than 15° C., and injectable at a low pressure. Thus, there is no problem when the isocyanate prepolymer is used for the preparation of a polyurethane foam at a molding temperature, for example, at 40° to 50° C.

In Process I, when the polyol component is reacted with the polyisocyanate component, those components are preferably blended in such a ratio that the isocyanate index is 95 to 105.

In Process I, a polyurethane foam can be obtained by mixing and stirring the polyol component and the polyisocyanate component, injecting the resulting mixture into a mold, and allowing the mixture to foam by means of a molding machine. Specifically, for example, the polyol component is usually heated up to about 40° C. using a tank and allowed to react with the polyisocyanate component using a foaming machine such as an automatically mixing and injecting foaming machine to form a polyurethane foam.

Also, according to Process I, the polyol component and the polyisocyanate component are blended together in advance, and the resulting mixture is molded into a urethane foam useful in shoe sole applications by means of a foaming machine the temperature of which is usually adjusted to about 40° to about 50° C.

Incidentally, Process I can be employed for the preparation of non-expanded elastomer products. When this process is employed for the production of a shoe sole, the process improves mechanical strength such as tensile strength and tear strength of the resulting polyurethane foam, nevertheless the resin amount per unit volume is decreased.

Secondly, process II is described below.

In Process II, a polyurethane foam is prepared by reacting an isocyanate prepolymer made of a polyisocyanate component and a polyol component (I), with a polyol component (II), wherein the polyol component (I) comprises a polyester-polyol prepared by polycondensation of an acid component comprising (a) terephthalic acid and (b) adipic acid, and a polyhydric alcohol, in which the molar ratio of (a) terephthalic acid/(b) adipic acid is 0.05 to 0.3.

As the polyisocyanate component which is a starting material of the above isocyanate prepolymer, there can be cited, for instance, the polyisocyanate monomers which can be employed in Process I.

Examples of the above polyisocyanate monomers include those exemplified in Process I. Among them, single use of 4,4'-diphenylmethane diisocyanate or the combined use of 4,4'-diphenylmethane diisocyanate and a carbodiimide-modified 4,4'-diphenylmethane diisocyanate is particularly preferred in the present invention.

The polyol component (I), which a starting material of the above-mentioned isocyanate prepolymer, comprises the aforementioned polyester-polyol.

In Process II, since the use of the above polyester-polyol permits to maintain the viscosity of the resulting isocyanate prepolymer at an appropriate level, this process can impart excellent mechanical strength to the resulting polyurethane foam.

In the polyol component (I) used in Process II, a polyol other than the above polyester polyol can be also used. Examples of such polyol include, for instance, the same polyols as those used in Process I.

It is desired that the content of the polyester-polyol in the polyol component (I) is 23 to 58% by weight, preferably 31 to 52% by weight.

It is desired the ratio of the polyisocyanate component to the polyol component (I) is adjusted such that the equivalent ratio of NCO group/OH group is usually about 5 to about 30.

In the preparation of an isocyanate prepolymer, auxiliaries such as self-polymerization inhibitors, antioxidants and ultraviolet absorbing agents may be optionally used.

Examples of the above self-polymerization inhibitors can be the same as those used in the preparation of isocyanate prepolymer in Process I.

Examples of the above antioxidants and ultraviolet absorbing agent can be the same as those used in the polyol component in Process I.

By stirring and reacting the polyisocyanate component, the polyol component and optionally auxiliaries, an isocyanate prepolymer can be obtained.

It is desired that the content of NCO in the isocyanate prepolymer is not less than 12%, preferably not less than 14% in order to avoid undesirably high viscosity which causes difficulties in molding with a low-pressure foaming machine; and not more than 25%, preferably not more than 22% in order to avoid undesirably low viscosity which results in poor measuring accuracy of a foaming machine.

The above isocyanate prepolymer is in a state of liquid at a temperature of not lower than 15° C., and injectable at a low pressure. Thus, there is no problem when the isocyanate prepolymer is used for the preparation of a polyurethane foam at a molding temperature, for example, at 40° to 50° C.

Next, a polyurethane foam can be prepared by reacting the above isocyanate prepolymer with the polyol component (II).

Examples of the polyol component (II) which is reacted with the isocyanate prepolymer can be the same as the polyol component used in Process I except for the polyester-polyol.

To the above polyol component (II) used in the reaction with the isocyanate prepolymer, auxiliaries such as chain extenders, blowing agents, urethane promoting catalysts, stabilizers and pigments may optionally be added in appropriate amounts. Examples of the auxiliaries can be the same as those added to the polyol component used in Process I.

In Process II, it is desired that the polyol component (II) and the polyisocyanate component are blended in a ratio such that the isocyanate index is 95 to 105.

In Process II, a polyurethane foam can be obtained by mixing and stirring, the isocyanate prepolymer, the polyol component (II) and optionally appropriate auxiliaries, injecting the resulting mixture into a mold, and allowing the mixture to foam by means of a molding machine. Specifically, for example, the polyol component (II) is usually heated up to about 40° C. using a tank and allowed to react with the isocyanate prepolymer using a foaming machine such as an automatically mixing and injecting foaming machine or an automatically blending and injecting foaming machine to form a polyurethane foam.

Also, according to Process II, the isocyanate prepolymer and the polyol component (II) are blended together in advance, and the resulting mixture is molded into a urethane foam useful in shoe sole applications by means of a foaming machine the temperature of which is usually adjusted to about 40° to about 50° C.

Incidentally, Process II can be employed for the preparation of non-expanded elastomer products. When this process is employed for the production of a shoe sole, the process improves mechanical strength such as tensile strength and tear strength of the resulting polyurethane foam, nevertheless the resin amount per unit volume is decreased.

It is practically desired that the density of the polyurethane foams prepared by Process I and Process II is 0.15 to 1.0 g/cm$^3$, preferably 0.2 to 0.6 g/cm$^3$ from the viewpoint of sufficient mechanical strength and low density.

According to the process of the present invention, an advantageous effect, which permits the preparation of a low density polyurethane foam having acceptable appearance and feeling, and markedly improved physical properties such as tensile and tear strength, can be achieved.

EXAMPLES

The following examples illustrate the present invention but are not intended to limit the invention in any manner.

Preparation Example 1
(Preparation of Polyester-polyol)

In a four-necked flask, 100 parts by weight of adipic acid, 12.6 parts by weight of terephthalic acid and 51.1 parts by weight of ethylene glycol were placed, and the flask was equipped with a stirring rod, a dehydration tube, a nitrogen inlet and a thermometer. The molar ratio of terephtalic acid to adipic acid was 0.11.

Then, nitrogen gas was introduced into the flask, water generated was distilled off with paying careful attention to abrupt boiling. The content of the flask was heated up to 220° C.

After the transparency of the reaction mixture was confirmed, the pressure in the flask was gradually reduced for further distilling off water.

The reaction was continued until the acid value of the resulting reaction mixture became at most 1 KOH mg/g to yield Polyester-polyol A.

Acid value, hydroxyl value, viscosity, solidification point and number average molecular weight were determined as the physical properties of the resulting Polyester-polyol A.

The above measurements were carried out according to the following methods: acid value was determined by JIS K 0070; hydroxyl value, JIS K 0070; viscosity, JIS Z 8803; and solidification point, JIS K 0065.

As a result, the following results were obtained as the physical properties of Polyester-polyol A: Acid value was 0.86 KOHmg/g; hydroxyl value, 51.4 KOHmg/g; viscosity at 60° C., 1900 cP, solidification point, 22° C.; and number average molecular weight, 2147.

Preparation Example 2
(Preparation of Polyester-polyol)

In a four-necked flask, 100 parts by weight of adipic acid, 12.6 parts by weight of terephthalic acid and 75.2 parts by weight of 1,4-butanediol were placed, and the flask was equipped with a stirring rod, a dehydration tube, a nitrogen inlet and a thermometer. The molar ratio of terephtalic acid to adipic acid was 0.11.

Then, nitrogen gas was introduced into the flask, water generated was distilled off with paying careful attention to abrupt boiling. The content of the flask was heated up to 220° C.

After the transparency of the reaction mixture was confirmed, the pressure in the flask was gradually reduced for further distilling off water.

The reaction was continued until the acid value of the resulting reaction mixture became at most 1 KOH mg/g to yield Polyester-polyol B.

Acid value, hydroxyl value, viscosity, solidification point and number average molecular weight were determined as the physical properties of the resulting Polyester-polyol B in the same manner as in Preparation Example 1.

As a result, the following results were obtained as the physical properties of Polyester-polyol B: Acid value was 0.93 KOHmg/g; hydroxyl value, 50.4 KOHmg/g; viscosity at 60° C., 2250 cP, solidification point, 27° C.; and number average molecular weight, 2186.

Production Example 1
(Preparation of Polyol Solution)

There were mixed 40 parts by weight of Polyester-polyol A obtained in Preparation Example 1, 60 parts by weight of polyester-polyol (ethylene diethylene adipate, number average molecular weight: 1, 300), 11 parts by weight of ethylene glycol as a chain extender, 1.05 parts by wight of water as a blowing agent, 0.8 part by weight of triethylenediamine as a catalyst and 1 part by weight of a silicone cell regulator together, and agitated with heating to the temperature of 60° C. to give Polyol solution 1.

As physical properties of Polyol solution 1, acid value, hydroxyl value and viscosity were determined in the same manner as in Preparetion Example 1, and water content was determined in accordance with JIS K 0068.

As a result, the resulting Polyol solution 1 had the following physical properties: acid value, 0.21 KOHmg/g; hydroxyl value, 237.5 KOHmg/g; water content, 0.91% by weight; and viscosity at 40° C., 1480 cP.

Production Example 2
(Preparation of Polyol Solution)

There were mixed 40 parts by weight of Polyester-polyol A obtained in Preparation Example 1, 60 parts by weight of polyester-polyol (ethylene-1,4-butanediol adipate, number average molecular weight: 1, 300), 11 parts by weight of ethylene glycol as a chain extender, 1.05 parts by wight of water as a blowing agent, 0.8 part by weight of triethylenediamine as a catalyst and 1 part by weight of a silicone cell regulator together, and agitated with heating to the temperature of 60° C. to give Polyol solution 2.

The physical properties of Polyol solution 2 were determined in the same manner as in Production Example 1.

As a result, the resulting Polyol solution 2 had the following physical properties: acid value, 0.35 KOHmg/g; hydroxyl value, 238.4 KOHmg/g; water content, 0.92% by weight; and viscosity at 40° C., 1520 cP.

Production Example 3
(Preparation of Polyol Solution)

There were mixed 60 parts by weight of Polyester-polyol A obtained in Preparation Example 1, 40 parts by weight of polyester-polyol (ethylene-1,4-butanediol adipate, number average molecular weight: 1, 300), 11 parts by weight of ethylene glycol as a chain extender, 1.05 parts by wight of water as a blowing agent, 0.8 part by weight of triethylenediamine as a catalyst and 1 part by weight of a silicone cell regulator together, and agitated with heating to the temperature of 60° C. to give Polyol solution 3.

The physical properties of Polyol solution 3 were determined in the same manner as in Production Example 1.

As a result, the resulting Polyol solution 3 had the following physical properties: acid value, 0.21 KOHmg/g; hydroxyl value, 232.1 KOHmg/g; water content, 0.91% by weight; and viscosity at 40° C., 18870 cP.

Production Example 4
(Preparation of Polyol Solution)

There were mixed 40 parts by weight of Polyester-polyol B obtained in Preparation Example 2, 60 parts by weight of polyester-polyol (ethylene-1,4-butanediol adipate, number average molecular weight: 1, 300), 11 parts by weight of ethylene glycol as a chain extender, 1.05 parts by wight of water as a blowing agent, 0.8 part by weight of triethylenediamine as a catalyst and 1 part by weight of a silicone cell regulator together, and agitated with heating to the temperature of 60° C. to give Polyol solution 4.

The physical properties of Polyol solution 4 were determined in the same manner as in Production Example 1.

As a result, the resulting Polyol solution 4 had the following physical properties: acid value, 0.18 KOHmg/g; hydroxyl value, 238.3 KOHmg/g; water content, 0.91% by weight; and viscosity at 40° C., 1560 cP.

Production Example 5
(Preparation of Polyol Solution)

There were mixed 40 parts by weight of polyester-polyol (ethylene-1,4-butanediol adipate, number average molecular weight: 2, 200), 60 parts by weight of polyester-polyol (ethylene-1,4-butanediol adipate, number average molecular weight: 1, 300), 11 parts by weight of ethylene glycol as a chain extender, 1.05 parts by wight of water as a blowing agent, 0.8 part by weight of triethylenediamine as a catalyst and 1 part by weight of a silicone cell regulator together, and agitated with heating to the temperature of 60° C. to give Polyol solution 5.

The physicalproperties of Polyol solution 5 were determined in the same manner as in Production Example 1.

As a result, the resulting Polyol solution 5 had the following physical properties: acid value, 0.21 KOHmg/g; hydroxyl value, 232.0 KOHmg/g; water content, 0.91% by weight; and viscosity at 40° C., 1210 cP.

Examples 1 to 4

Each of the polyol solutions (Polyol solutions 1 to 4 prepared in Production Examples 1 to 4) was blended with an isocyanate prepolymer (NCO %: 18.5%) commercially available from Kao Corporation under the trade name of B-2009; placed in an automated blending injection foaming machine (Model MU-203S, No. 6-018, made by Polyurehtane Engineering Co., Ltd.); and reacted under the following molding conditions to yield a polyurethane foam sheet of 10 mm×100 mm×30 mm. Polyol solutions used in each of Examples 1 to 4 are listed in Table 1.

[Molding Conditions]

Isocyanate index: 100 to 103
Mixing temperature: Each temperature of the isocyanate prepolymer and polyol components was adjusted to 35° to 45° C.

Reaction time:
  Cream time: 5 to 10 seconds
  Silk time: 15 to 25 seconds
  Rise time: 35 to 60 seconds
  Tack free time: 30 to 55 seconds
Mold:
  Temperature of mold: 45° to 55° C.
  Mold release agent: silicone and wax
Density:
  Free foam density: 0.12 to 0.32 g/cm³
  Density of foamed article: 0.35 g/cm³
Maturing conditions: 1 week at ordinary temperature As physical properties of the urethane foam sheets obtained, C hardness, tensile strength, tear strength and elongation at break were determined in accordance with the following methods. The results are shown in Table 1.

[Physical Properties of Urethane Foam Sheet]
C hardness (ASKER-C): determined according to SRIS 0101
Tensile strength: determined according to JIS K 6301 using a dumb-bell of JIS No.1
Tear strength: determined according to JIS K 7311
Elongation at break: determined according to JIS K 6301 using a dumb-bell of JIS No. 1

Comparative Example 1

A polyurethane foam was prepared in the same procedures as in Example 1 except that Polyol solution 5 obtained in Production Example 5 and an isocyanate prepolymer (NCO %: 18.5%) commercially available from Kao Corporation under the trade name of B-2009 were blended together as the polyol and isocyanate components.

The physical properties of the polyurethane foam sheet were determined in the same manner as in Example 1.

TABLE 1

| | | Physical properties of urethane foam sheet | | | | |
|---|---|---|---|---|---|---|
| Ex. No. | Kind of Polyol solution | Density (g/cm³) | C Hardness (ASKER-C) | Tensile strength (kgf/cm²) | Tear strength (kgf/cm) | Elongation at break (%) |
| 1 | Polyol solution 1 | 0.35 | 66 | 37.6 | 17.3 | 380 |
| 2 | Polyol solution 2 | 0.35 | 65 | 38.1 | 17.4 | 380 |
| 3 | Polyol solution 3 | 0.35 | 66 | 38.4 | 17.5 | 370 |
| 4 | Polyol solution 4 | 0.35 | 65 | 39.2 | 17.6 | 390 |
| Comp. Ex. 1 | Polyol solution 5 | 0.35 | 64 | 34.0 | 16.8 | 380 |

The results in Table 1 show that the tensile strength and tear strength of the polyurethane foam sheets obtained in Examples 1 to 4 are much better than those of Comparative Example 1, even though there was no significant difference in molding density.

Preparation Example 3
(Preparation of Polyester-polyol)

In a four-necked flask, 100 parts by weight of adipic acid, 2.27 parts by weight of terephthalic acid and 46.9 parts by weight of ethylene glycol were placed, and the flask was equipped with a stirring rod, a dehydration tube, a nitrogen inlet and a thermometer. The molar ratio of terephthalic acid to adipic acid was 0.02.

Then, nitrogen gas was introduced into the flask, water generated was distilled off with paying careful attention to abrupt boiling. The content of the flask was heated up to 220° C.

After the transparency of the reaction mixture was confirmed, the pressure in the flask was gradually reduced for further distilling off water.

The reaction was continued until the acid value of the resulting reaction mixture became 1 or lower to yield Polyester-polyol C.

Acid value, hydroxyl value, viscosity, solidification point and number average molecular weight were determined as the physical properties of the resulting Polyester-polyol C in the same manner as in Production Example 1.

As a result, the following results were obtained as the physical properties of Polyester-polyol C: Acid value was 0.35 KOHmg/g; hydroxyl value, 50.4 KOHmg/g; viscosity at 60° C., 1400 cP, solidification point, 48° C.; and number average molecular weight, 2211.

Preparation Example 4
(Preparation of Polyester-polyol)

In a four-necked flask, 100 parts by weight of adipic acid, 45.8 parts by weight of terephthalic acid and 64.6 parts by weight of ethylene glycol were placed, and the flask was equipped with a stirring rod, a dehydration tube, a nitrogen inlet and a thermometer. The molar ratio of terephthalic acid to adipic acid was 0.40.

Then, nitrogen gas was introduced into the flask, water generated was distilled off with paying careful attention to abrupt boiling. The content of the flask was heated up to 220° C.

After the transparency of the reaction mixture was confirmed, the pressure in the flask was gradually reduced for further distilling off water.

The reaction was continued until the acid value of the resulting reaction mixture became 1 or lower to yield Polyester-polyol D.

Acid value, hydroxyl value, viscosity, solidification point and number average molecular weight were determined as the physical properties of the resulting Polyester-polyol D in the same manner as in Production Example 1.

As a result, the following results were obtained as the physical properties of Polyester-polyol D: Acid value was 0.74 KOHmg/g; hydroxyl value, 50.3 KOHmg/g; solidification point, 62° C.; and number average molecular weight, 2119.

Production Example 6
(Production of Isocyanate Prepolymer)

In a four-necked flask, 100 parts by weight of 4,4'-diphenylmethane diisocyanate was placed, and the temperature of the reaction system was kept at 60° C. Then, the flask was equipped with a stirring rod, a dehydration tube, a nitrogen inlet and a thermometer.

Thereto was gradually added dropwise 72.5 parts by weight of Polyester-polyol A obtained in Preparation Example 1 at 40° C. in a nitrogen stream while the contents of the flask was violently stirred. The reaction was continued for 2 hours with keeping the temperature of the reaction system at 50° to 70° C.

Then, to the mixture of the flask, 11 parts by weight of carbodiimide-modified MDI commercially available from Nippon Polyurethene, Co., Ltd., under the trade name of COLONATE MX was added, and the reaction mixture was further matured for 1 hour to yield an isocyanate prepolymer (NCO %: 18.5%, viscosity at 60° C.: 225 cP).

Production Example 7
(Production of Isocyanate Prepolymer)

In a four-necked flask, 100 parts by weight of 4,4'-diphenylmethane diisocyanate was placed, and the temperature of the reaction system was kept at 60° C. Then, the flask was equipped with a stirring rod, a dehydration tube, a nitrogen inlet and a thermometer.

Thereto was gradually added dropwise 72.5 parts by weight of Polyester-polyol B prepared in Preparation Example 2 at 40° C. in a nitrogen stream while the contents of the flask was violently stirred. The reaction was continued for 2 hours with keeping the temperature of the reaction system at 50° to 70° C.

Then, to the mixture of the flask, 11 parts by weight of carbodiimide-modified MDI commercially available from Nippon Polyurethene, Co., Ltd. under the trade name of COLONATE MX was added, and the reaction mixture was further matured for 1 hour to yield an isocyanate prepolymer (NCO %: 18.5%, viscosity at 60° C.: 235 cP).

Production Example 8
(Production of Isocyanate Prepolymer)

The solidification poind of Polyester-polyol C obtained in Preparation Example 3 was too high to be added dropwise at 40° C. Thus, it was impossible to handle Polyester-polyol C in the same manner as for Polyester-polyols B and C.

Therefore, it was rather difficult to prepare a prepolymer using the polyester-polyol C obtained in Preparation Example 3.

Production Example 9
(Production of Isocyanate Prepolymer)

The attempt to prepare a desired isocyanate prepolymer using Polyester-polyol D obtained in Preparation Example 4 in the same manner as in Production Examples 6 and 7 ended in failure, because the solidification point and viscosity of Polyester-polyol D were too high to be added in a drop-by-drop manner even at 90° C. with causing clogging of a feeding pipe.

Therefore, the temperature of the Polyester-polyol D was increased to a level at which Polyester-polyol D could be added dropwise, and the reaction was carried out. As a result, the reaction became out of control due to the addition of thermal energy of exothermic prepolymerization to result in gelation of the reaction mixture.

Examples 5 and 6, and Comparative Example 2

A polyol component was obtained by mixing 100 parts by weight of Polyester-polyol A made of ethylene glycol, diethylene glycol and adipic acid (number average molecular weight: 2,200), 11 parts by weight of ethylene glycol, 1.05 parts by weight of water, 0.8 part by weight of triethylenediamine and 1 part by weight of a silicone foam stabilizer.

Next, a polyurethane foam sheet was prepared by reacting the above polyol component with each of the isocyanate prepolymers produced in Production Examples 6 and 7, or an isocyanate prepolymer commercially available from Kao Corporation under the trade name of B-2009 (NCO %: 18.5%) in the same manner as in Example 1.

Physical properties of the polyurethane foam sheet obtained were determined in the same manner as in Example 1.

Examples 7 and 8, and Comparative Example 3

A polyol component for foam formation was obtained by mixing 60 parts by weight of a polyester-polyol (number average molecular weight: 2,200) made of ethylene glycol, 1,4-butylene glycol and adipic acid, 40 parts by weight of polyester-polyol (number average molecular weight: 1,300) made of ethylene glycol, 1,4-butylene glycol and adipic acid, 11 parts by weight of ethylene glycol, 1.65 parts by weight of water, 0.8 part by weight of triethylenediamine and 1 part by weight of a silicone foam stabilizer.

Next, a polyurethane foam sheet was prepared by reacting the above polyol component with each of the isocyanate prepolymers obtained in Production Examples 6 and 7, or an isocyanate prepolymer (NCO %: 18.5%) commercially available from Kao Corporation under the trade name of B-2009 in the same manner as in Example 1.

Physical properties of the polyurethane foam sheet obtained were determined in the same manner as in Example 1. The results are shown in Table 2.

TABLE 2

| | | Physical properties of urethane foam sheet | | | | |
|---|---|---|---|---|---|---|
| Ex. No. | Kind of Polyester-polyol | Density ($g/cm^3$) | C Hardness (ASKER-C) | Tensile strength ($kgf/cm^2$) | Tear strength (kgf/cm) | Elongation at break (%) |
| 5 | Polyester-polyol A | 0.35 | 68 | 39.4 | 18.0 | 370 |
| 6 | Polyester-polyol B | 0.35 | 67 | 41.2 | 18.4 | 380 |
| 7 | Polyester-polyol A | 0.35 | 66 | 40.2 | 18.4 | 380 |
| 8 | Polyester-polyol B | 0.35 | 65 | 42.0 | 18.8 | 390 |
| Comp. Ex. | | | | | | |
| 2 | B-2009 | 0.35 | 65 | 33.1 | 16.3 | 380 |
| 3 | B-2009 | 0.35 | 66 | 35.8 | 17.1 | 370 |

The results in Table 2 show that the tensile strength and tear strength of the polyurethane foam sheets obtained in Examples 5 to 9 are much better than those of Comparative Examples 2 and 3, even though there was no significant difference in molding density.

Those skilled in the art will recognize, or be able to ascertain using no more than routine experimentation, many equivalents to the specific embodiments of the present invention described specifically herein. Such equivalents are intended to be encompassed in the scope of the following claims.

What is claimed is:

1. A polyester-polyol prepared by polycondensation of an acid component comprising (a) terephthalic acid and (b) adipic acid with a polyhydric alcohol component, wherein the molar ratio of said (a) terephthalic acid/(b) adipic acid is 0.05 to 0.3.

2. The polyester-polyol according to claim 1, wherein the polyester-polyol has a number average molecular weight of 500 to 3000.

3. The polyester-polyol according to claim 1, wherein the polyhydric alcohol component is selected from ethylene glycol and 1,4-butanediol.

4. A process for preparing a polyurethane foam comprising reacting a polyisocyanate component and a polyol component, wherein the polyol component comprises a polyester-polyol prepared by polycondensation of an acid component comprising (a) terephthalic acid and (b) adipic acid with a polyhydric alcohol component, wherein the molar ratio of said (a) terephthalic acid/(b) adipic acid is 0.05 to 0.3.

5. The process for preparing a polyurethane foam according to claim 4, wherein the content of said polyester-polyol in the polyol component is from 10 to 80% by weight.

6. A process for preparing a polyurethane foam comprising reacting an isocyanate prepolymer prepared from a polyisocyanate compound and a polyol component (I), with a polyol component (II), wherein the polyol component (I) comprises a polyester-polyol prepared by polycondensation of an acid component comprising (a) terephthalic acid and (b) adipic acid, and a polyhydric alcohol component, wherein the molar ratio of said (a) terephthalic acid/(b) adipic acid is 0.05 to 0.3.

7. The polyester-polyol according to claim 2, wherin the polyhydric alcohol component is selected from ethylene glycol and 1,4-butanediol.

8. The process of claim 4, wherein said polyhydric alcohol component is ethylene glycol or 1,4-butanediol.

9. The process of claim 6, wherein said polyhydric alcohol component is ethylene glycol or 1,4-butanediol.

* * * * *